(12) United States Patent
Yamaguchi

(10) Patent No.: US 7,423,783 B2
(45) Date of Patent: Sep. 9, 2008

(54) COLOR IMAGE SCANNING AND PRINTING DEVICE WITH EFFICIENT CONVERSION OF SCANNED IMAGE DATA INTO PRINT IMAGE DATA

(75) Inventor: Tetsuharu Yamaguchi, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1163 days.

(21) Appl. No.: 10/671,013

(22) Filed: Sep. 25, 2003

(65) Prior Publication Data

US 2004/0174547 A1 Sep. 9, 2004

(30) Foreign Application Priority Data

Nov. 5, 2002 (JP) ............................. 2002-321572

(51) Int. Cl.
- H04N 1/29 (2006.01)
- H04N 1/00 (2006.01)
- G06F 3/12 (2006.01)
- G03G 15/01 (2006.01)
- G03G 15/00 (2006.01)
- G03G 21/14 (2006.01)

(52) U.S. Cl. .................. 358/300; 358/1.1; 358/401; 399/298; 399/204; 399/368; 399/130; 399/76

(58) Field of Classification Search ............... 399/204, 399/368, 53, 54, 76, 77, 82, 38, 66, 85, 130, 399/154, 297, 298, 302, 303, 308; 358/1.1, 358/1.4, 1.7, 1.17, 300, 1.9, 296, 302, 400, 358/401, 474

See application file for complete search history.

(56) References Cited

U.S. PATENT DOCUMENTS 5,040,075 A * 8/1991 Takayanagi .................. 358/300
5,734,951 A * 3/1998 Maekawa et al. ............ 399/169
5,839,039 A * 11/1998 Yamada ...................... 399/298

FOREIGN PATENT DOCUMENTS

| EP | 1041817    | 10/2000 |
|----|------------|---------|
| JP | 08-142414  | 6/1996  |
| JP | 08-192542  | 7/1996  |
| JP | 10-285413  | 10/1998 |
| JP | 2000-148996| 5/2000  |
| JP | 2001-100953| 4/2001  |
| JP | 2001-328322| 11/2001 |
| JP | 2002-118701| 4/2002  |

* cited by examiner

Primary Examiner—King Poon
Assistant Examiner—Peter L Cheng
(74) Attorney, Agent, or Firm—Hogan & Hartson LLP

(57) ABSTRACT

A color image scanning and printing device includes a scanning unit which scans an image of a plural number of pages, a conversion unit performing a conversion process by converting a scanned result scanned by the scanning unit into image data of each of a plurality of color components for printing one page as a unit, a printing unit which prints an image based on the converted image data of each of the color components, and a control unit which executes the conversion process by the conversion unit for a part of the color components of the scanned result of the image of the plural number of pages, prior to the conversion process by the conversion unit for remaining color components.

15 Claims, 4 Drawing Sheets

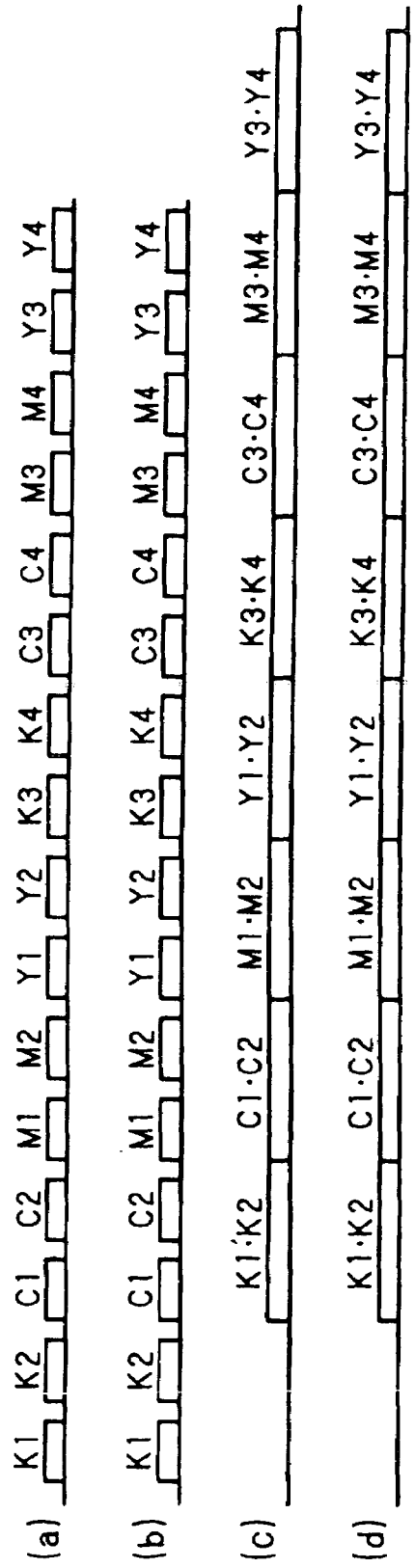

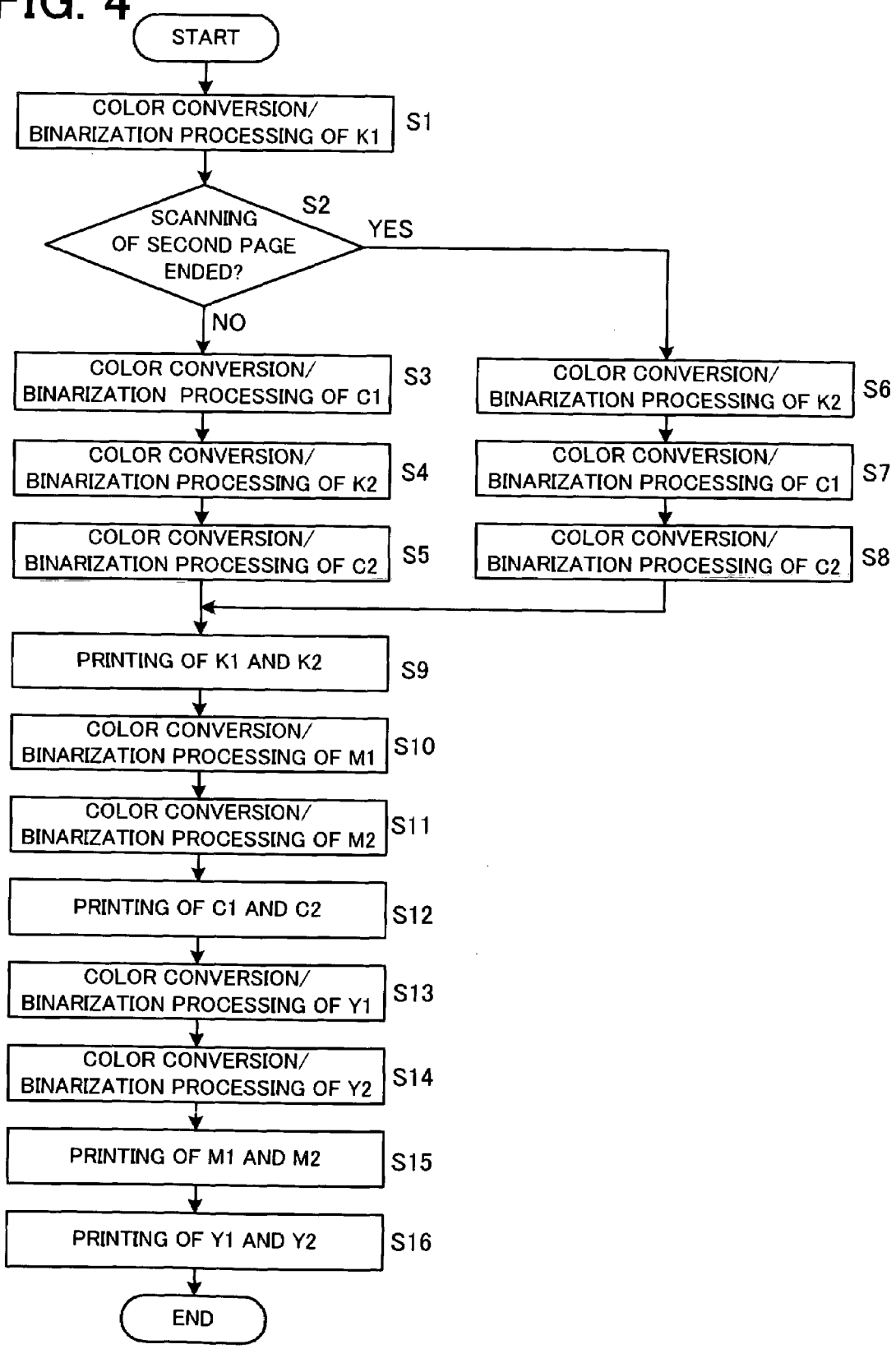

COLOR IMAGE SCANNING AND PRINTING DEVICE WITH EFFICIENT CONVERSION OF SCANNED IMAGE DATA INTO PRINT IMAGE DATA

BACKGROUND OF THE INVENTION

1. Field of the Invention

The present invention relates to a color image scanning and printing device which scans an image of an original document, and prints out a color image based on the obtained image data.

2. Description of the Related Art

A multifunction facsimile machine (facsimile multifunction peripheral) exists that includes a transmission function and a printer function, in addition to the conventional copy function and facsimile function. The transmission function is a function to transmit data transmitted from a Personal Computer (PC) to another facsimile machine when the multifunction facsimile machine is connected to the PC via a communications network such as a Local Area Network (LAN). The printer function is a function to print out the data transmitted from the PC.

Accompanying an extension of the printer function, a color image scanning and printing function is included with the facsimile multifunction peripheral. For example, the color image scanning and printing function is executed as follows. An image of an original document is scanned by a color Charge Coupled Device (CCD), and image data (Red Green Blue (RGB) or Lab) of the obtained color system is once stored to a multilevel memory. Then, the image data fetched from the multilevel memory is converted into printing binary image data of a plurality of color components, Cyan, Magenta, Yellow, and blacK (CMYK). The converted image data is stored to a binary memory, and the color image is printed out on a paper in accordance with the image data fetched from the binary memory. There are many proposals made regarding management and control for transmitting the image data of the four color components, CMYK, to a printing unit.

Such a color image scanning and printing function requires a conversion process for converting the obtained RGB or Lab image data into image data of the CMYK color components for printing. Therefore, when the conversion process is not carried out efficiently, a time lag generates with respect to the printing process, and a long period of time is taken for the entire scanning and printing processes.

SUMMARY OF THE INVENTION

The present invention was made in consideration to the above-described circumstance. An advantage of the present invention is to provide a color image scanning and printing device which can reduce the time required for a printing process, and the entire time required for the printing and scanning processes by efficiently controlling a conversion process for converting the scanned image data into image data for printing.

According to a first aspect of the present invention, a color image scanning and printing device includes a scanning unit which scans image of a plural number of pages of original documents. In addition, the color image scanning and printing device includes a conversion unit which converts a scanned result obtained by the scanning unit into image data of color components for printing one page as a unit. The color image scanning and printing device also includes a printing unit which prints out an image based on the converted image data of each of the color components. With respect to the scanned result of the image of the plural number of pages, a conversion process by the conversion unit for a part of the plurality of color components is carried out prior to a conversion process by the conversion unit for the remaining color components.

According to the first aspect, when scanning an image of a plural number of pages of original documents and converting the scanned result of the plural number of pages into image data of each of the color components for printing, the conversion process is not carried out sequentially for each of the color components with one page as a unit. Instead, the conversion process over a plural number of pages for a part of the color components is executed first, and then, the conversion process over a plural number of pages for the remaining color components is executed. A specific example of such a conversion process is determined in accordance with a capacity of a memory which stores the converted image data of each of the color components, and/or an amount of data which can be processed within one printing process by the printing unit. For example, after the scanning process of the image of a first page of the original documents, during an available time when the image of a second page of the original documents is being scanned, the conversion process for a part of the color components based on the scanned result of the first page may be completed, and such a conversion process can be carried out efficiently. As a result, the entire processing time including the time required for the printing process can be reduced.

According to a second aspect of the present invention, in the color image scanning and printing device, the printing unit prints an image based on image data of two pages of original documents for each of the color components. When the color components are four colors, a conversion process by the conversion unit for two color components for the two pages is carried out prior to a conversion process by the conversion unit for the remaining two color components for the two pages. Before the scanning unit scans the image of the second page of the original documents, the conversion process by the conversion unit for the preceding two color components for the first page is completed.

According to the second aspect, the printing unit prints out the image based on the image data of each of the color components for two pages in a first printing process. Then, when the color components are four colors (Cyan, Magenta, Yellow, and Black), the conversion process by the conversion unit for the two color components (K, C) for the two pages is executed prior to the conversion process by the conversion unit for the remaining two color components (M, Y) for the two pages. While the image of the second page of the original documents is scanned, the conversion process for the two color components (K, C) is completed in accordance with the scanned result of the first page. Specifically, the conversion process is executed in an order of the K component of the first page, the C component of the first page, the K component of the second page, and the C component of the second page, and the printing process for the K component and the C component is executed. Then, the conversion process is executed in an order of the M component of the first page, the M component of the second page, the Y component of the first page, and the Y component of the second page, and the printing process for the M component and the Y component is executed. Accordingly, the conversion process for the C component of the first page can be carried out during the scanning process of the second page, and the entire processing time can be reduced.

According to a third aspect of the present invention, the color image scanning and printing device further includes an encoding unit which encodes the converted image data of each of the color components, a storage unit which stores the image data encoded by the encoding unit, and a decoding unit which decodes the encoded image data stored in the storage unit. The printing unit prints out the image based on the decoded result of the decoding unit.

According to the third aspect, the image data of each of the color components obtained by the conversion process is encoded, and the encoded image data is decoded when printing out. As a result, a printing process, a sort printing process or the like can be executed at any time with small memory source.

BRIEF DESCRIPTION OF DRAWINGS

FIG. 3 is a timing chart showing a sequence of a color printing process under a decode printing mode.

FIG. 4 is a flowchart showing an operation procedure of a two-up method printing process.

DETAILED DESCRIPTION OF THE PREFERRED EMBODIMENTS

Figure 1:
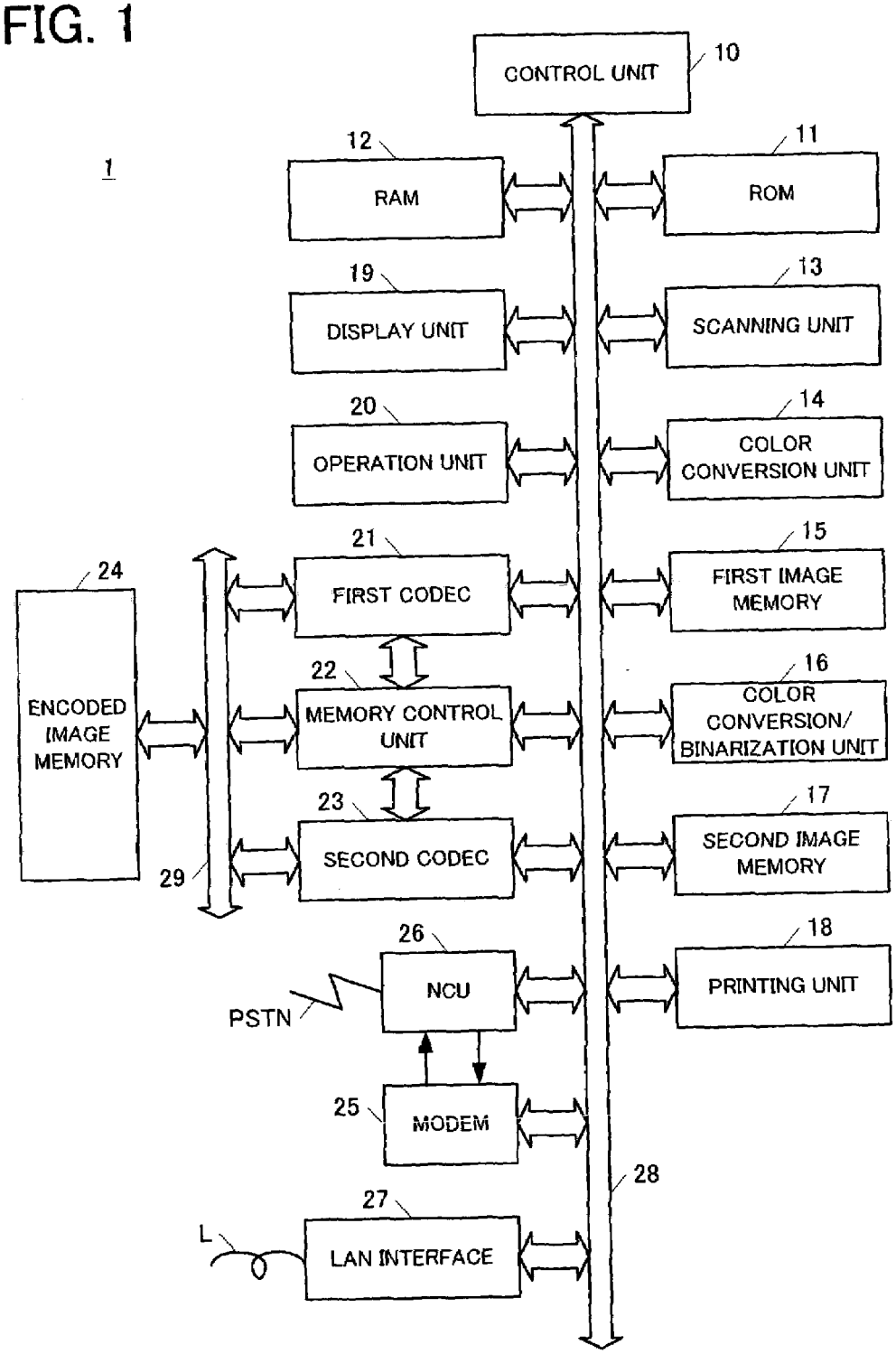
FIG. 1 is a block diagram showing a configuration of a facsimile multifunction peripheral as a color image scanning and printing device of the present invention.

An embodiment of the present invention will be described in details with reference to the drawings. FIG. 1 is a block diagram showing a configuration of a facsimile multifunction peripheral 1 as a color image scanning and printing device of the present invention. The facsimile multifunction peripheral 1 includes a control unit 10, a Read Only Memory (ROM) 11, a Random Access Memory (RAM) 12, a scanning unit 13, a color conversion unit 14, a first image memory 15, a color conversion/binarization unit 16, a second image memory 17, a printing unit 18, a display unit 19, an operation unit 20, a first codec 21, a memory control unit 22, a second codec 23, an encoded image memory 24, a modem 25, a Network Control Unit (NCU) 26, and a LAN interface 27 or the like.

The control unit 10 is specifically formed from a Central Processing Unit (CPU). The control unit 10 is connected to each of the above-mentioned hardware units of the facsimile multifunction peripheral 1 via a system bus 28. The control unit 10 controls each of the hardware units, and executes various software functions in accordance with computer programs stored in the ROM 11.

The ROM 11 stores in advance, various software programs that are necessary for the operation of the facsimile multifunction peripheral 1. The RAM 12 is formed from a Static Random Access Memory (SRAM), a flash memory or the like. The RAM 12 stores temporary data that generates when the software is executed.

The scanning unit 13 includes a color Charge Coupled Device (CCD), an Analog Front End (AFE), and a shading correction unit or the like. The color CCD scans an image of an original document, and obtains an analog signal of a color system that is expressed by Red, Green, and Blue (RGB). The AFE amplifies the analog signal, which shows each of the R component, the G component, and the B component of the obtained RGB color system, into a prescribed size. Then, the AFE carries out sampling under each prescribed timing, and obtains a multilevel (9 bit) digital signal. The shading correction unit carries out corrections to eliminate various distortions that are generated in an illumination system, an optical system, and an imaging pick-up device of the color CCD.

The color conversion unit 14 converts the 9 bit image data of the RGB color system that is output from the scanning unit 13 into 8 bit image data of the Lab color system. The first image memory 15 is a multilevel memory that is formed from a Dynamic Random Access Memory (DRAM) or the like. The first image memory 15 once stores the 8 bit image data of the Lab color system. The first image memory 15 can store the Lab image data for two pages of A4 sized original documents at once.

The color conversion/binarization unit 16 fetches the 8 bit image data of the Lab color system that is stored in the first image memory 15, and converts the fetched 8 bit image data of the Lab color system into binary image data of a CMYK color system. The second image memory 17 is a binary memory that is formed from a DRAM or the like, and stores the converted binary image data of the CMYK color system. The second image memory 17 can store the binary image data of each of the color components of the CMYK color space only for four pages of A4 sized original documents at once.

The printing unit 18 is an electro-photographic typed printing device. The printing unit 18 prints out as a hardcopy, the image based on the binary image data of each of the colors (C/M/Y/K) that is stored in the second image memory 17. The printing unit 18 is a printing device which includes a four-cycled engine that forms images sequentially. An electrostatic latent image for black based on the binary K component image data is formed on a photosensitive drum, and black toner is adhered to the electrostatic latent image. Then, black toner image is developed and transferred onto a recording paper, and a black image is formed. Next, similar processing is executed accordingly to each of the binary C component image data, the binary M component image data, and the binary Y component image data. Then, a full color image based on the scanned image data is printed out on a recording paper. Here, the amount of data of the electrostatic latent image that can be formed on the photosensitive drum at one time is two pages of A4 sized paper (one page of A3 sized paper). Thus, when the image of the original document to be scanned is A4 sized, each of the color components for two pages can be printed out by one process (two-up method printing process). Moreover, the printing unit 18 also prints out an image based on the image data received by a facsimile communication and the image data input from a remote PC.

The display unit 19 is a displaying device such as a liquid crystal display, a Cathode Ray Tube (CRT) display or the like. The display unit 19 displays an operational state of the facsimile multifunction peripheral 1, and displays an input made by a user operating the operation unit 20. The operation unit 20 includes various function keys that are necessary for operating the facsimile multifunction peripheral 1. Further, by forming the display unit 19 as a touch panel, a part or all of the various keys of the operation unit 20 can be substituted.

The first codec 21 executes an encoding process to the binary image data of the CMYK color system that is converted by the color conversion/binarization unit 16. The encoded image data is stored into the encoded image memory 24 via an image bus 29 in accordance with a control of the memory control unit 22. The second codec 23 carries out a decoding process to the encoded image data that is stored in the encoded image memory 24 in accordance with a control of the memory control unit 22, and outputs the decoded binary image data of the CMYK color system.

The modem 25 is connected to the system bus 28, and is formed from a faxmodem that can carry out a facsimile communication. Moreover, the modem 25 is connected directly to the NCU 26 that is also connected to the system bus 28. The NCU 26 is hardware that carries out closing and releasing operations of a Public Switched Telephone Network (PSTN). The NCU 26 connects the modem 25 to a telephone line when necessary. The LAN interface 27 is connected to a LAN by a communication line L, and exchanges data with a PC that is connected to the LAN.

The facsimile multifunction peripheral 1 of the present invention has the above-described configuration. As a form of the printing process, there is a mode to scan an image of an original document and to print out a color image as it is based on the scanned image data (hereinafter referred to as the image printing mode), and a mode to print out a color image based on the image data obtained by decoding the encoded image data that is stored in the encoded image memory 24 (hereinafter referred to as the decode printing mode).

Next, a color image scanning and printing operation of the facsimile multifunction peripheral 1 will be described. First, a processing under the image printing mode will be described.

The color CCD of the printing unit 13 scans an image of an original document, and an analog signal of the color system that is expressed by the RGB is obtained. The analog signal is converted into a digital signal (digital data which the R component, the G component, and the B component are all 9 bits) by the AFL, and a shading correction is applied to the converted digital signal. The 9 bit image data of the RGB color system is converted into 8 bit image data of the Lab color system by the color conversion unit 14. The converted 8 bit image data of the Lab color system is once stored into the first image memory 15 which is a multilevel memory.

The 8 bit image data of the Lab color system that is stored in the first image memory 15 is fetched, and converted into binary image data of the CMYK color system by the color conversion/binarization unit 16. Specifically, based on the 8 bit Lab image data, the image data for printing which the K component, the C component, the M component, and the Y component are respectively a 1 bit pixel is generated by the color conversion/binarization unit 16. The converted binary image data of the CMYK color system is sequentially stored into the second image memory 17 which is a binary memory.

The binary image data of each of the colors that is stored in the second image memory 17 is fetched in an order of K, C, M and Y. Then, the toner images of each of the colors are formed sequentially by the printing unit 18, and a full color printing is carried out.

Figure 2:
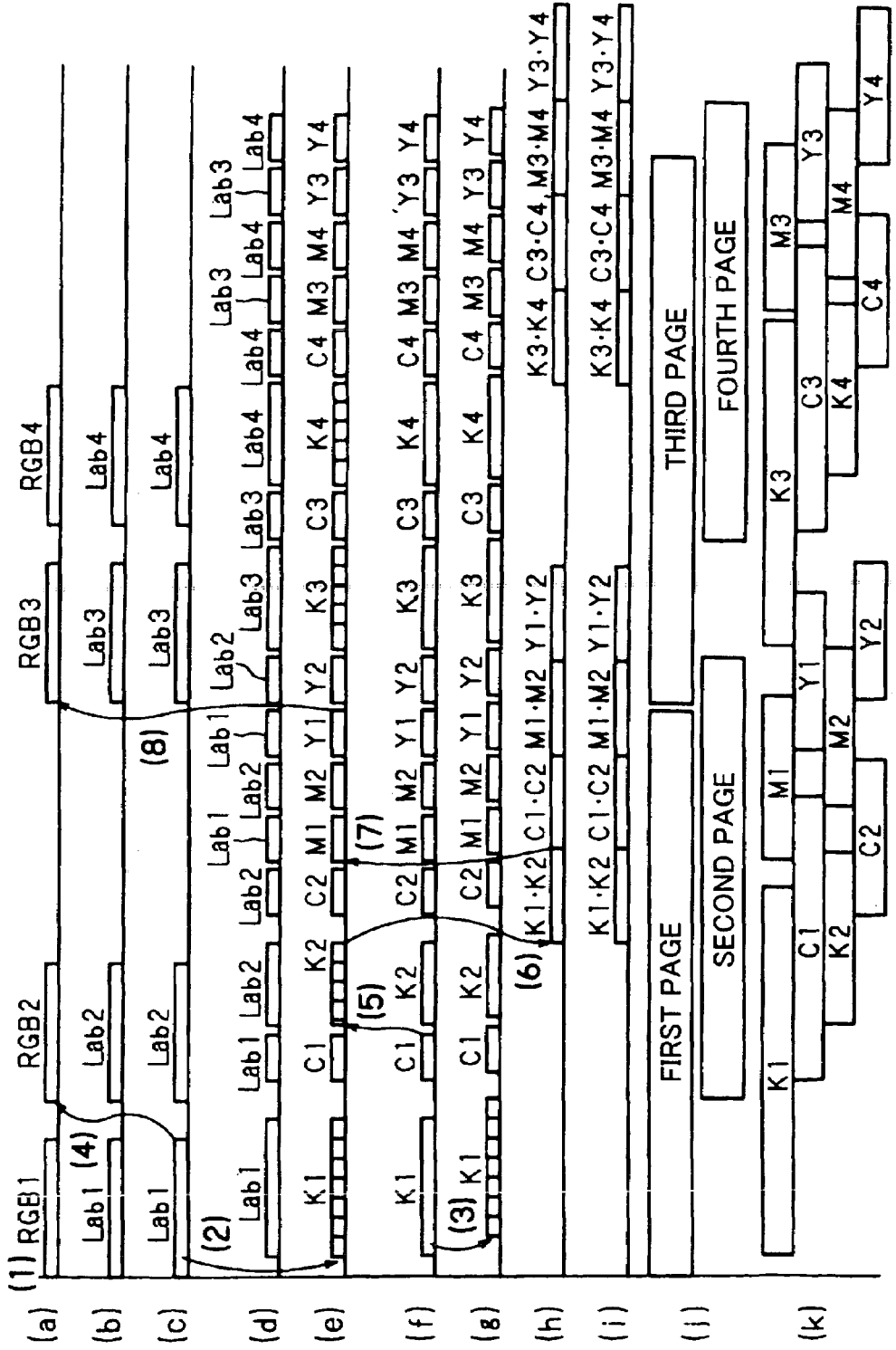
FIG. 2 is a timing chart showing a sequence of a color image scanning and printing process under an image printing mode.

FIG. 2 is a timing chart which shows a sequence of a color image scanning and printing process under the image printing mode. FIG. 2 shows (a) a scanning process by the scanning unit 13, (b) a color conversion process by the color conversion unit 14, (c) a writing process to the first image memory 15, (d) a fetching process from the first image memory 15, (e) a color conversion/binarization process by the color conversion/binarization unit 16, (f) a writing process to the second image memory 17, (g) a fetching process for encoding from the second image memory 17 and an encoding process by the first codec 21, (h) a fetching process for printing from the second image memory 17, (i) a printing process by the printing unit 18, (j) a state of data stored in the first image memory 15, and (k) a state of data stored in the second image memory 17. Further, a size of the image of an original document is supposed to be A4 size.

In FIG. 2, (1) shows a starting point of a scanning process of an image of a first page of original documents. An arrow (2) shows a starting point of the color conversion/binarization process by the color conversion/binarization unit 16 after writing several lines of the Lab image data of the first page (Lab 1) into the first image memory 15. For the first color component K (K components (K1, K2, K3, K4) of first, second, third, and fourth pages), the color conversion/binarization process is carried out by the color conversion/binarization unit 16 to each of the lines. Meanwhile, for the remaining color components C, M, and Y (C1~C4, M1~M4, and Y1~Y4), since the Lab image data of all lines are stored, the color conversion/binarization process is carried out by the color conversion/binarization unit 16 to all of the lines at once.

In FIG. 2, an arrow (3) shows a starting point of the encoding process by the first codec 21 after writing (storing) into the second image memory 17, the image data of several lines of the K component (K1) for the first page. An arrow (4) shows a starting point of the scanning process of the image of the second page of the original documents after completing the writing of the Lab 1 into the first image memory 15. An arrow (5) shows a starting point of the color conversion/binarization process in the K component (K2) of the second page after completing the writing of the C component (C1) of the first page into the second image memory 17.

Furthermore, in FIG. 2, an arrow (6) shows a starting point of the printing process of the black image by fetching the K components (K1, K2) of two pages from the second image memory 17 after completing the writing of the K components (K1, K2) into the second image memory 17. An arrow (7) shows a starting point of the color conversion/binarization process in the M component (M1) of the first page when the printing process of the black image of two pages has been completed. An arrow (8) shows a starting point of the scanning process of the image of the third page of the original documents when the color conversion/binarization process in the Y component (Y1) of the first page has been completed.

Under the above-described sequence, with the scanning process of the image of two pages of the original documents as one unit, the color conversion/binarization process is executed in an order of K1/C1/K2/C2/M1/M2/Y1/Y2, and the printing process is executed in an order of K1·K2/C1·C2/M1·M2/Y1·Y2.

The following sequence can be considered regarding the color conversion/binarization process for the four color components. An image of a first page of the original documents is scanned, and a color conversion/binarization process is executed on each of the color components of the scanned result (Lab image data). Then, K1, C1, M1 and Y1 are obtained sequentially. Next, the image of the second page of the original documents is scanned, and K2, C2, M2 and Y2 are obtained sequentially in the same manner. Under this sequence, the two-up method printing process cannot be carried out until K1 and K2 are available. As a result, a timing to start the printing process is delayed considerably. As another sequence, an image of the first page of the original documents is scanned to obtain K1, an image of the second page of the original documents is scanned to obtain K2, and then, C1, C2, M1, M2, Y1, and Y2 are obtained sequentially. Under this sequence, since K1 and K2 can be obtained at an early stage compared to the above-described sequence, the printing process of the black image can be started under a fast timing. However, the generation of the next C1 and C2 is not completed at a time the printing process of K1 and K2 is completed. As a result, a timing to start the printing process of the C1 and C2 is delayed.

On the contrary, in the present invention, the color conversion/binarization process is executed in an order of K1/C1/K2/C2. That is, while the image of the second page of the original documents is scanned, the color conversion/binarization process for the C component (C1) of the first page is completed. As a result, at a time the printing process of the K1 and K2 is completed, the generation of the next C1 and C2 is completed, and the next printing process of the C1 and C2 can be carried out incessantly after the printing process of the K1 and K2 (refer to FIG. 2(i)). The time required for the printing process is short. Since the color conversion/binarization process of a part of the color components (here, C component) is executed by using an available time during the scanning process of the image of the second page of the original documents, an extremely efficient color conversion/binarization process can be realized, and the entire processing time can be reduced.

Next, a processing under the decode printing mode will be described. The first codec 21 encodes the binary image data of the CMYK color system that is converted by the color conversion/binarization unit 16 (refer to FIG. 2(g)). Then, the encoded image data is stored into the encoded image memory 24 via the image bus 29 in accordance with the control of the memory control unit 22.

Then, the encoded image data that is stored in the encoded image memory 24 is fetched to be decoded by the second codec 23 in accordance with the control of the memory control unit 22. The decoded binary image data of the CMYK color system is sequentially stored once into the second image memory 17. The binary image data of each of the colors that is stored in the second image memory 17 is fetched in an order of K, C, M, and Y. Then, the toner image of each of the colors is formed sequentially, and a full color printing is executed by the printing unit 18.

FIG. 3 is a timing chart showing a sequence of the color printing process under the decode printing mode. FIG. 3 shows each of processing operations of (a) decoding process by the second codec 23, (b) writing process to the second image memory 17, (c) fetching process for printing from the second image memory 17, and (d) printing process by the printing unit 18. Further, the size of the image of an original document is A4 size.

Under the decode printing mode by the sequence shown in FIG. 3, with image data obtained by scanning the image of two pages of original documents as one unit, a decoding process is executed in an order of K1/K2/C1/C2/M1/M2/Y1/Y2, and a printing process is executed in an order of K1·K2/C1·C2/M1·M2/Y1·Y2. Under the decode printing mode, since the color conversion/binarization process for all color components are completed, the order of the decoding process can be set in any order. However, since the printing process for each of the colors can be carried out one after another, the above-mentioned decoding order is the most efficient.

FIG. 4 is a flowchart showing an operation procedure of the above-described two-up method printing process.

First, a color conversion/binarization process for the K component (K1) of the first page is executed (step S1). The control unit 10 determines whether or not a scanning process of the image of the second page of the original documents is completed (step S2). When the scanning process is not completed (step S2: NO), a color conversion/binarization process for the C component (C1) of the first page is executed (step S3), and a color conversion/binarization process for the K component (K2) and the C component (C2) of the second page is executed sequentially (steps S4, S5). Then, the process proceeds to step S9. Meanwhile, when the scanning process of the image of the second page of the original documents is completed (step S2: YES), the color conversion/binarization process for the K component (K2) of the second page, the C component of the first page (C1), and the C component (C2) of the second page are carried out sequentially (steps S6, S7, S8), and the process proceeds to step S9.

After the printing process of the K components (K1 and K2) of the first page and the second page are executed (step S9), the color conversion/binarization process for the M component (M1) of the first page, and the M component (M2) of the second page are executed sequentially (steps S10, S11). Next, after the printing process of the C components (C1 and C2) of the first page and the second page are executed (step S12), the color conversion/binarization process of the Y component (Y1) of the first page and the Y component (Y2) of the second page are executed (steps S13, S14). Then, the printing process of the M components (M1 and M2) of the first page and the second page, and the printing process of the Y components (Y1 and Y2) of the first page and the second page are executed sequentially (steps S15, S16).

Further, the above-described example is an example of the two-up method printing process in which the color conversion/binarization process is executed in an order of K1/C1/K2/C2/M1/M2/Y1/Y2. However, the above-described example is just one example, and an order of the color conversion/binarization process for each of the color components can be determined appropriately such that the printing process of each of the colors can be carried out smoothly.

Moreover, in the above-described example, the image is printed by being converted into binary image data of the CMYK color system. However, the present invention can also be applied to a case in which a multilevel (in the above-described example, 8 bits) Lab image data is converted into multilevel image data of the CMYK color components.

As described above, according to the present invention, when converting the scanned result for the scanned plural number of pages into the image data of each of the color components for printing, the conversion process over a plural number of pages for a part of the color components is executed, and then, the conversion process over a plural number of pages for the remaining color components is executed. As a result, the conversion process for converting the scanned result into the image data for printing can be executed efficiently, and the time required for the printing process and the entire time required for the scanning and printing processes can be reduced.

In addition, according to the present invention, the image data of each of the color components that is obtained by the conversion process is encoded, and the encoded image data is decoded when printing. As a result, a printing process, a sort printing process or the like can be executed at any time using a small amount of memory.

What is claimed is:

1. A color image scanning and printing device comprising:
a scanning unit which scans an image of a plural number of pages;
a conversion unit performing a conversion process by converting a scanned result scanned by the scanning unit into image data of each of a plurality of color components for printing one page as a unit;
a printing unit which prints an image based on the converted image data of each of the color components; and
a control unit which executes the conversion process by the conversion unit for a part of the color components of the scanned result of the image of the plural number of pages, prior to the conversion process by the conversion unit for remaining color components, wherein
the printing unit prints an image based on image data of two pages for each of the color components,
when the plurality of color components are four colors, a conversion process for two preceding color components of the two pages is executed by the conversion unit prior to a conversion process for a remaining two color components of the two pages by the conversion unit,
wherein the conversion process for the two preceding color components of a first page of the two pages by the conversion unit occurs while the scanning unit scans an image of a second page of the two pages, and the conversion process for the two preceding color components of the first page of the two pages by the conversion unit is completed before the conversion process is executed for the two preceding color components of the second page of the two pages, and before the scanning unit completely scans the image of the second page.

2. The color image scanning and printing device according to claim 1, further comprising:

means for encoding the converted image data of each of the plurality of color components:

means for storing the image data encoded by the means for encoding; and means for decoding the encoded image data that is stored in the means for storing;

wherein the printing unit prints an image based on a decoded result of the means for decoding.

3. The color image scanning and printing device according to claim 1, wherein the control unit executes software functions according to stored computer programs.

4. The color image scanning and printing device according to claim 3, further comprising a read only memory to store the computer programs.

5. The color image scanning and printing device according to claim 1, wherein the scanning unit includes a charge coupled device.

6. The color image scanning and printing device according to claim 1, wherein the printing unit is an electro-photographic typed printing device.

7. The color image scanning and printing device according to claim 1, wherein the printing unit includes a photosensitive drum.

8. The color image scanning and printing device according to claim 1, further comprising a display unit to display an operation state of the device.

9. The color image scanning and printing device according to claim 8, wherein the display unit is liquid crystal display.

10. The color image scanning and printing device according to claim 8, wherein the display unit is a cathode ray tube.

11. A color image scanning and printing device comprising:

means for scanning an image of a plural number of pages;

means for performing a conversion process by converting a scanned result scanned by the means for scanning into image data of each of a plurality of color components for printing one page as a unit;

means for printing an image based on the converted image data of each of the color components;

means for executing the conversion process by the means for performing a conversion process for a part of the color components of the scanned result of the image of the plural number of pages, prior to the conversion process by the means for performing a conversion for remaining color components;

means for executing a conversion process for two preceding color components of a first page and a second page of the plural number of pages prior to a conversion process for a remaining two color components of the two pages when the plurality of color components are four colors;

wherein the conversion process for the two preceding color components of the first page of the two pages occurs while the means for scanning scans an image of the second page, and means for completing a conversion process for the two preceding color components of the first page before the conversion process is executed for the two preceding color components of the second page and before completely scanning the image of the second page.

12. A color image scanning and printing method comprising:

scanning an image of a plural number of pages;

performing a conversion process by converting the scanned image of a plural number of pages into image data of each of a plurality of color components for printing one page as a unit;

printing an image based on the converted image data of each of the color components;

executing the conversion process for a part of the color components of the scanned image of the plural number of pages, prior to the conversion process for remaining color components;

printing an image based on image data of two pages for each of the color components;

executing a conversion process for two preceding color components of the two pages prior to a conversion process for a remaining two color components of the two pages when the plurality of color components are four colors;

wherein the conversion process for the two preceding color components of a first page of the two pages occurs while scanning an image of a second page of the two pages, and completing a conversion process for the two preceding color components of the first page of the two pages before the conversion process is executed for the two preceding color components of the second page of the two pages and before completely scanning the image of the second page.

13. The color image scanning and printing method according to claim 12, further comprising encoding the converted image data of each of the plurality of color components.

14. The color image scanning and printing method according to claim 13, further comprising storing the encoded image data.

15. The color image scanning and printing method according to claim 14, further comprising decoding the stored encoded image data.

* * * * *